2,897,113

FUNGICIDAL COMPOSITIONS COMPRISING 6-ALKYL-3-CYCLOHEXYL-3,4-DIHYDRO-2H-1,3-BENZOXAZINES AND METHOD OF USE

Richard H. Gruenhagen and Lois L. Fritts, Midland, Mich., assignors to The Dow Chemical Company, Midland, Mich., a corporation of Delaware No Drawing. Application April 30, 1956
Serial No. 581,314

9 Claims. (Cl. 167—33)

This invention relates to fungicidal compositions and is particularly concerned with a method for protecting plants from attack by fungus organisms.

According to this invention, it has been found that fungicidal compositions containing benzoxazines as active ingredients and particularly 6-alkyl-3-cyclohexyl-3,4-dihydro-2H-1,3-benzoxazines having the general structure.

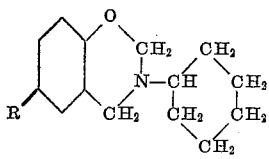

wherein R is an alkyl radical containing from 3 to 12 carbon atoms, inclusive, possess excellent fungicidal properties against parasitic fungi which attack living plants. Furthermore, these fungicidal compositions may be applied in effective dosage to plants, seeds or plant parts substantially without injury to plant foliage.

The compounds of the present invention have been particularly useful in controlling *Alternaria solani*, the causative organism of tomato early blight. They are also useful in controlling other plant pathogens such as *Phytophthora infestans*, the causative organism of late blight of tomato and potato, *Puccinia graminis-tritici*, the causative organism of wheat rust, and *Venturia inaequalis*, the causative organism of apple scab.

In carrying out the method of the present invention, compositions containing the active ingredient are applied to the infected or susceptible surfaces. A convenient and preferred method is to spray the plant surfaces with a liquid dispersion or emulsion of the toxicant. Dust dispersions of the benzoxazine in finely divided solids also may be employed to treat the infected or susceptible surfaces.

The compositions of the present invention contain in addition to the benzoxazine toxicant one or more of a plurality of additaments including aqueous carriers, petroleum distillate and other organic dispersion media, surface active dispersing agents, emulsifiers and finely divided inert solids. The concentration of the benzoxazine compound in these compositions may vary depending on whether the composition is intended for direct application to plants or is designed as a concentrate. Those contaning relatively high concentrations of the toxicant may be considered as concentrates and be subsequently diluted with additional inert carrier to produce the ultimate treating composition. Concentrate compositions usually contain from 2 to 95 percent active ingredient.

The desirable concentration of benzoxazine in a treating composition for direct application to plants varies with the fungus organism to be controlled, the plant under treatment, the circumstance under which control is to be accomplished, to a certain extent the particular benzoxazine toxicant employed, and whether the composition to be employed is a spray or dust mixture. A spray treating composition should contain at least 1/64 pound of active ingredient in 100 gallons of ultimate mixture and may contain as much as 6 pounds per 100 gallons. When treatment is to be carried out in the greenhouse, liquid toxicant compositions conveniently may contain from 1/32 pound to 1/16 pound of toxicant in 100 gallons of dispersion media. When treatment is to be carried out in the field, a somewhat higher concentration of toxicant is desirable, and preferred range is from 1/4 pound to 4 pounds of active ingredient in 100 gallons.

Treating compositions are most conveniently formulated by preparing liquid or solid concentrate compositions which are subsequently diluted to produce a composition of the desired concentration. Emulsifiable liquid concentrates may be prepared by incorporating from about 2 to 50 percent of the active ingredient and a surface active dispersing agent in a suitable water-immiscible organic liquid. Such concentrates may be further diluted with water to form spray mixtures in the form of oil-in-water emulsions. Such spray compositions then comprise active toxicant, water-immiscible solvent, emulsifying agent and water. Dispersing agents are preferably of the non-ionic type and include condensation products of alkylene oxides with phenols and organic acids, polyoxyethylene derivatives of sorbitan esters, complex ether alcohols, and the like. Suitable organic liquids to be employed include petroleum hydrocarbons, halohydrocarbons, and aromatic hydrocarbons.

Solid concentrate mixtures may be prepared by incorporating from about 25 to 90 percent of the benzoxazine compound in finely divided solid carriers such as bentonite, fuller's earth, diatomaceous earth, talc, chalk and the like. Additional inert solid carriers may be added to such concentrate mixtures to form dust treating compositions, which may contain from 1 to 75 percent by weght of the benzoxazine toxicant. Alternatively, dispersing and/or wetting agents may be incorporated along with the benzoxazine in the solid carrier to form wettable powder concentrates which subsequently may be dispersed in water or aqueous carrier to form spray compositions. Suitable wetting and emulsifying agents include sodium lauryl sulfate, glyceryl oleate and sulfonated aromatic hydrocarbons.

Concentrate mixtures of the toxicant and surface active dispersing agents may be prepared which contain from 25 to 95 percent of the benzoxazine compound. The dispersing agent may be of the ionic or non-ionic type and include alkyl aryl sulfonate, alkylated aryl polyether alcohols, polymerized sodium salt of a substituted benzoid alkyl sulfonic acid, polyoxyethylene derivatives of sorbitan esters, and the like. Such concentrate mixtures may be dispersed in aqueous carriers to form treating compositions. Alternatively they may be diluted with inert solid such as bentonite or diatomaceous earth to form wettable powders, or with water-immiscible organic liquids to form emulsifiable concentrates. The wettable powders or emulsifiable concentrates may then be further diluted with aqueous carriers to form spray compositions.

Further, the benzoxazine toxicant may be incorporated in solutions, simple dispersions, aerosol formulations and other media adaptable to be employed for treating vegetation.

In operating according to the method of the present invention, the toxicant composition is applied to infected or susceptible plant surfaces in any convenient fashion such as spraying, dusting, dipping and drenching. A spray method is considered preferable, especially where large numbers of plants are involved because of the rapidity and uniformity of treatment possible. In spraying, it is usually sufficient for the infected or susceptible surfaces to be thoroughly wet with the liquid dispersion employed. Good results have been obtained by employing spray compositions whether they be emulsions or aqueous dispersions of solid concentrates.

The following examples illustrate the invention but are not to be construed as limiting.

EXAMPLE 1

Various toxicant compositions were prepared by mixing 25 parts by weight of 6-alkyl-3-cyclohexyl-3,4-dihydro-2H-1,3-benzoxazine, 10 parts by weight of a dimeric alkylated aryl polyether alcohol (Triton X–155) and 65 parts by weight of xylene to form emulsifiable concentrates. The concentrate compositions were diluted with water to form spray compositions containing ⅛ pound of toxicant per 100 gallons of ultimate composition.

These compositions were employed in greenhouse tests against plant fungus organisms. Tomato plants 3 to 5 inches high were sprayed with formulations of the toxicant by placing the plant on a turntable in front of a spray gun, and rotating the plant at a predetermined rate until all the foliage had been sprayed. After drying, the treated plants and untreated controls were inoculated by spraying with an aqueous suspension of viable spores of *Alternaria solani,* the causative organism of tomato early blight disease. The inoculated plants were placed in chambers maintained at 100 percent relative humidity at 70° F., conditions which are optimum for development of the disease. Twenty-four hours later the plants were removed to a greenhouse. After 48 hours in the greenhouse the plants were observed for development of the disease. Lesions or spots appear on the leaves of diseased plants. The number of spots appearing on the treated plants were compared with the check plants and rated for percent control. Those plants showing no lesions and therefore fully protected by the treating composition were rated as 100 percent controlled at the concentration tested. The results are given in the following table:

*Control of tomato early blight* (Alternaria solani) *with 6 - alkyl - 3 - cyclohexyl - 3,4 - dihydro - 2H - 1,3-benzoxazine at ⅛ pound per 100 gallons of spray composition*

| Alkyl substituent: | Percent control |
|---|---|
| Isopropyl | 89 |
| Secondary butyl | 87 |
| Tertiary butyl | 85 |
| Normal amyl | 96 |
| 1-methylbutyl | 94 |
| 1,1-dimethylpropyl | 99 |
| 1-methylpentyl | 98 |
| 1,1-dimethylbutyl | 100 |
| 1-ethyl-1-methylpropyl | 100 |
| 1-ethyl-1-methylbutyl | 99 |
| 1,1,3,3-tetramethylbutyl | 97 |
| Nonyl | 96 |
| Dodecyl | 83 |

EXAMPLE 2

In an experiment carried out in a manner similar to that described in Example 1 but employing a spray composition containing $\frac{1}{32}$ pound of toxicant per 100 gallons of ultimate mixture, good controls of tomato early blight were obtained. The results are given in the table below.

*Control of tomato early blight* (Alternaria solani) *with 6 - alkyl - 3 - cyclohexyl - 3,4 - dihydro - 2H - 1,3-benzoxazine at $\frac{1}{32}$ pound per 100 gallons of spray composition*

| Alkyl substituent: | Percent control |
|---|---|
| Secondary butyl | 83 |
| 1,1-dimethylpropyl | 94 |
| 1,1-dimethylbutyl | 83 |
| 1-ethyl-1-methylpropyl | 98 |
| 1-ethyl-1-methylbutyl | 78 |
| 1,1,3,3-tetramethylbutyl | 79 |
| Dodecyl | 82 |

EXAMPLE 3

Wettable powder compositions embodying the benzoxazine compounds are prepared by mechanically mixing and hammermilling together formulations as follows:

| Ingredient: | Parts by weight |
|---|---|
| 6 - alkyl - 3 - cyclohexyl - 3,4 - dihydro - 2H-1,3-benzoxazine | 25 |
| Compounded polymerized sodium salt of a substituted benzoid alkyl sulfonic acid (Daxad 27) | 2 |
| Alkyl aryl sulfonate (Nacconol NR) | 2 |
| Floridin clay | 71 |

The above prepared concentrate compositions are dispersed in water to produce spray compositions containing 1 pound of toxicant per 100 gallons of ultimate mixture. These compositions are sprayed onto numerous tomato plants subject to infection by *Phytophthora infestans,* while other tomato plants in the same area are left untreated as controls. The plants are examined at intervals for development of the tomato late blight disease. The leaves of untreated controls develop large dead areas as a result of Phytophthora infection while leaves of treated plants have little or no dead areas.

EXAMPLE 4

Wettable powder concentrates are prepared as described in Example 3. These concentrate compositions are dispersed in water to produce spray composiitons containing 2 pounds of toxicant per 100 gallons of ultimate mixture. These treating compositions are sprayed onto wheat plants susceptible to infection by *Puccinia graminis-tritici.* These treated plants as well as untreated plants are observed at intervals for the development of lesions and spots characteristic of wheat rust disease. The treated plants show substantially no lesions while many spots and lesions develop on untreated plants.

The benzoxazines employed in the present invention may be prepared by adding a 4-alkylphenol to an alcoholic solution of formaldehyde and cyclohexylamine and heating the resulting mixture. The product may be isolated and purified by conventional procedures. The preparation of preferred species of the benzoxazines with which the present invention is concerned is described in an application by Raymond H. Rigterink, Serial Number 581,283, now Patent No. 2,806,031, filed concurrently herewith.

We claim:

1. A fungicidal composition comprising at least 2% by weight of a 6-alkyl-3-cyclohexyl-3,4-dihydro-2H-1,3-benzoxazine wherein the alkyl radical contains from 3 to 12 carbon atoms, inclusive, and an inert carrier selected from the group consisting of a finely divided inert solid, a surface active dispersing agent, and a mixture of a water-immiscible organic liquid and a surface active emulsifying agent.

2. A concentrate fungicidal composition comprising from 25 to 95 percent by weight of active toxic ingredient and intimately admixed therewith a surface active dispersing agent, the toxic ingredient being a 6-alkyl-3-cyclohexyl-3,4-dihydro-2H-1,3-benzoxazine wherein the alkyl radical contains from 3 to 12 carbon atoms, inclusive.

3. A composition comprising an aqueous dispersion of the composition claimed in claim 2, the active ingredient being present in the amount of at least $\frac{1}{64}$ pound per 100 gallons of ultimate mixture.

4. A concentrate fungicidal composition comprising from 2 to 50 percent by weight of active toxic ingredient and intimately admixed therewith a water-immiscible organic liquid and a surface-active emulsifying agent, the toxic ingredient being a 6-alkyl-3-cyclohexyl-3,4-dihydro-2H-1,3-benzoxazine wherein the alkyl radical contains from 3 to 12 carbon atoms, inclusive.

5. A composition comprising an aqueous emulsion of the composition claimed in claim 4, the active ingredient being present in the amount of at least 1/64 pound per 100 gallons of ultimate mixture.

6. A method for suppressing parasitic fungus growth on living plants which comprises bringing into contact therewith a 6-alkyl-3-cyclohexyl-3,4-dihydro-2H-1,3-benzoxazine wherein the alkyl radical contains from 3 to 12 carbon atoms, inclusive.

7. A method of protecting seeds and plants subject to infection by fungi which comprises treating said material with a 6-alkyl-3-cyclohexyl-3,4-dihydro-2H-1,3-benzoxazine wherein the alkyl radical contains from 3 to 12 carbon atoms, inclusive.

8. A method for suppressing the growth of parasitic fungi on living plants which comprises spraying said plants with a dispersion in water of a 6-alkyl-3-cyclohexyl-3,4-dihydro-2H-1,3-benzoxazine, wherein the alkyl radical contains from 3 to 12 carbon atoms, inclusive.

9. A method for suppressing the growth of parasitic fungi on living plants which comprises dusting said plants with a dry dust composition comprising a 6-alkyl-3-cyclohexyl-3,4-dihydro-2H-1,3-benzoxazine, wherein the alkyl radical contains from 3 to 12 carbon atoms, inclusive.

References Cited in the file of this patent

UNITED STATES PATENTS

| | | |
|---|---|---|
| 2,776,281 | Wright | Jan. 1, 1957 |

FOREIGN PATENTS

| | | |
|---|---|---|
| 694,489 | Great Britain | July 22, 1953 |
| 695,550 | Great Britain | Aug. 12, 1953 |

OTHER REFERENCES

Chem. Abstr. II, vol. 43, 1049, p. 3425e.
Chem. Abstr. I, vol. 47, 1953, p. 9292h.